United States Patent Office 3,794,547
Patented Feb. 26, 1974

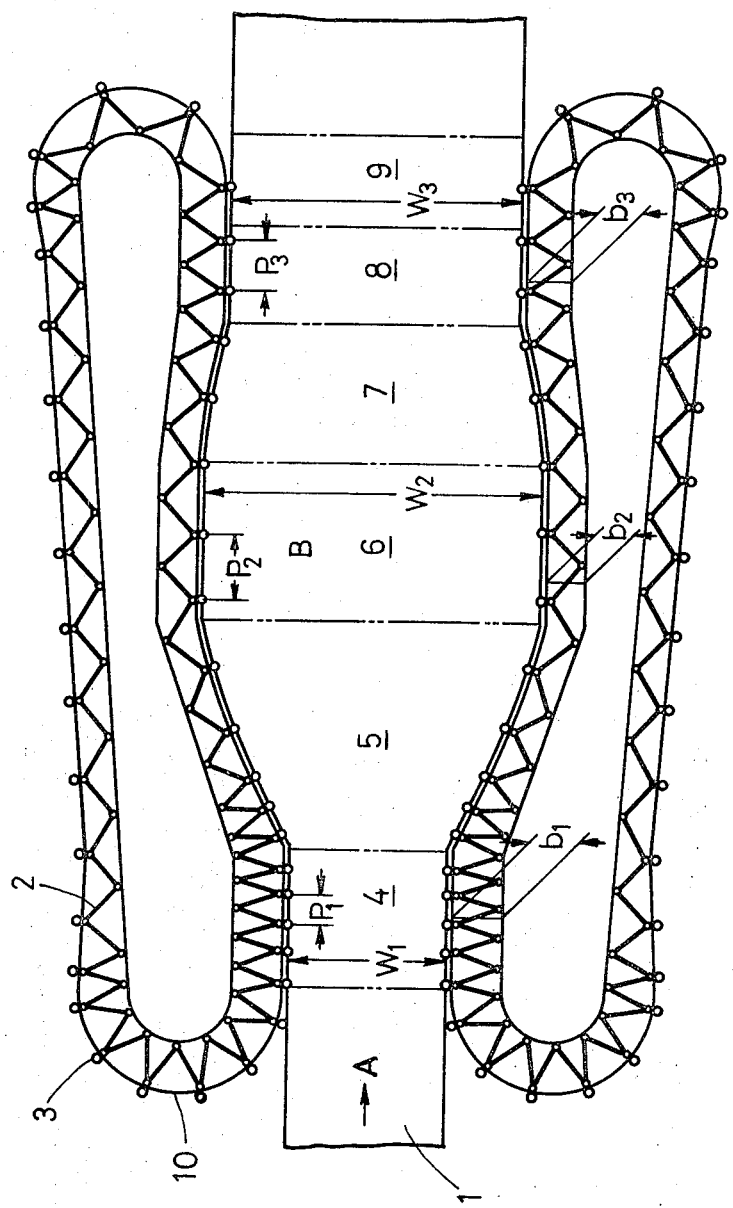

3,794,547
POLYAMIDE FILMS
Mutsuo Kuga, Kyoto, Takeshi Mashimo, Uji, and Motohiro Tsuruta, Kyoto, Japan, assignors to Unitika Kabushiki Kaisha, Amagasaki, Japan
Continuation-in-part of abandoned application Ser. No. 878,076, Nov. 19, 1969, which is a continuation-in-part of application Ser. No. 734,212, June 4, 1968, now Patent No. 3,502,766, which in turn is a continuation-in-part of abandoned application Ser. No. 536,481, Jan. 24, 1966. This application Dec. 6, 1971, Ser. No. 205,161
Claims priority, application Japan, Jan. 28, 1965, 40/4,857; Feb. 25, 1965, 40/10,484; Dec. 29, 1967, 43/85,026
Int. Cl. B32b 27/16
U.S. Cl. 161—1                                    4 Claims

ABSTRACT OF THE DISCLOSURE

This invention relates to very thin polyamide films having high purity and transparency, high tensile strength, and other improved properties.

RELATED APPLICATIONS

This application is a continuation-in-part of U.S. Ser. No. 878,076, filed Nov. 19, 1969 and now abandoned, which in turn is a continuation-in-part of U.S. Ser. No. 734,212, filed June 4, 1968, now U.S. Pat. No. 3,502,766, which in turn is a continuation-in-part of Ser. No. 536,481, filed Jan. 24, 1966 (now abandoned), all for the instant inventors.

BACKGROUND OF THE INVENTION

Films of polyesters, polypropylene, polyvinyl chloride, polyvinylidene chloride, polystyrene, polycarbonates, etc., have previously been prepared by biaxial drawing techniques. However, biaxial drawing techniques have not previously been developed for the drawing of polyamide films on a commercial scale, owing to the various difficult properties of polyamides.

Proposed methods for drawing crystalline resin films (e.g., polyesters and polypropylene) to improve the properties of films in general include the following:

(I) The method disclosed in Japanese patent specification No. 5,639/1955 in which the film is first drawn in one direction and then in the transverse direction to form an oriented film. Such a process can be called the "two-step biaxial process," which has been used, for example, to improve films made of polyesters and polypropylene. However, it has been shown that the two-step biaxial process employed to improve polyester and polypropylene films, does not usefully improve polyamide films.

Polyamides possess strong hydrogen bonds and low second order transition temperatures so that the work done factor necessary in drawing a polyamide film does not vary much with the draw temperature.

Moreover, polyamides are liable to necking-out when being drawn. Materials like polyamides, which possess strong hydrogen bonds and which are liable to necking-out cannot be usefully drawn by conventional processes. When polyamide films are drawn by any known two-step process, the molecules are first oriented in one direction, and are then oriented in the transverse direction by the second step. Strong hydrogen bonds are formed in the first step, and therefore, the second step fails and useful drawn film is not produced.

A further two-step process is disclosed in Japanese patent application No. 2,195/1962, in which a certain quantity of a monomer is utilized as plasticizer to improve the behavior of polyamide film in drawing. However, pure polyamide films are preferable to plasticized films, and biaxially oriented films have superior properties to those prepared by other known processes.

(II) In a process which has been employed in particular for drawing polypropylene, the material is drawn in a longitudinal direction by means of two sets of rollers spaced apart in the through-put direction of the material. The material is drawn in a transverse direction by gripping the previously thickened sides of the material in gripping conveyors which move apart.

The material is stretched between the rollers and is simultaneously drawn in the transverse direction. However, this process is not applicable for drawing polyamide films simultaneously and biaxially.

It is important to decrease the distance over which a film is in practice drawn, but it is difficult to decrease this distance when draw rollers are used. Any material like polyamides, which possess strong hydrogen bonds, may be liable to necking-out when drawn by such rollers, and there is the further disadvantage that the films produced have a reduced commercial value. Although such processes can give better results when materials such as polypropylene are drawn to stretch 5–20 fold in both the longitudinal and transverse directions, materials like polyamides, which are apparently not suitable for drawing to such an extent cannot be advantageously drawn simultaneously and biaxially by means of such rollers.

In drawing polyamide films to improve their properties, it is important to avoid unevenness of the film owing to necking-out. Therefore, the initial drawing must be very fast so as to be able to give a high degree of stretching to the resulting film.

SUMMARY OF THE INVENTION

We have now discovered that polyamide films must be drawn from the very first with a quicker speed and a larger degree of stretching at a higher temperature, if improved physical properties are to be attained. However, polyamide films produced by the simultaneous and biaxial drawing are liable to have disadvantages such as lower dimensional stability, when such films are used at elevated temperatures, e.g., in hot water.

It is an object of the present invention to form biaxially drawn films having substantially improved properties.

According to the present invention, such films are formed by the process of parent application Ser. No. 734,212, filed June 4, 1968 which is hereby incorporated by reference. In the aforesaid process for drawing a polyamide film, the film is positively drawn simultaneously in the longitudinal and transverse directions at a draw speed of from 6,000 to 100,000 percent/min. and at a temperature within the range of from 70° C. to 180° C. which is at least 35° C. below the melting point of the film, the ratio of the longitudinal and transverse draw speeds being from 2:1 to 0.5:1, and the draw ratio being from 16:1 to 4:1. Such a drawn film has improved properties, although it is difficult to remove distortions from the resulting film by the above-mentioned heat-setting process, in particular where improved dimensional stability is required.

When polyamide films oriented by the process of this invention are so treated to improve the dimensional stability by means of the conventional process (for example, the relaxation process, which is carried out in only one direction or in two directions separately) they can indeed be shrunk to a limited extent, but the treated films are liable to various disadvantages. For example, deterioration of the most desirable properties produced by the simultaneous biaxial drawing. However, in a preferred embodiment of the present invention, we have found that the dimensional stability can be remarkably improved without deterioration of mechanical properties by using a shrinking step in which the drawn film is shrunk simultaneously and biaxially by 1–10% in both the longitudinal and transverse directions at a ratio of shrinking speeds of 0.5–1 to 2.0:1. Such a shrinking step can, if desired, be followed by a heat-setting step carried out at a temperature of from 120° C. up to 10° C. below the melting point of the polyamide. The heat-setting can also be carried out after the drawing step, to improve the film further.

The polyamide films of the present invention have improved properties such as dimensional stability, tensile strength, and optical clarity. This process is effective in producing such unique films because the polyamide film is simultaneously drawn from the very first at a high speed with positive control over the biaxial drawing operation so as to fall within the preceding range.

It is not necessary to add any plasticizer. Although a plasticizer may be added to the polyamide film if desired, such an additive in general does not give any additional beneficial improvements in properties over those of pure polyamide films.

In one preferred process, the polyamide film after drawing is heated to a temperature from 120° C. to a temperature not higher than 10° C. below the melting point of the film under tension such that the transverse dimension is held substantially constant in order to remove distortion. The heat set film is then preferably subjected to a shrinking step, which is carried out from 120° C. to a temperature 10° C. below the melting point of the film simultaneously and biaxially in both the longitudinal and transverse directions to an extent of 1–10% and at a ratio of shrinking speeds of 0.5:1 to 2:1. The shrunk film is then preferably treated again as hereinbefore described in the heat-setting step.

In the following specification and claims, the term polyamide films includes in general films made of linear polyamides, for example: poly-ε-caproamide, poly-hexamethylene - adipamide, poly-hexamethylene-sebacamide, poly - 11 - amino - undecanamide, polylaurineamide, etc., mixture of two or more thereof.

It is preferred to use substantially amorphous polyamide films having a crystallinity of not more than 25% measured before treatment according to the present invention because polyamides having a crystallinity of more than 25% are liable to disadvantages such as breakage in drawing. Crystallinity can be defined as follows:

$$\text{Crystallinity} = \frac{(da-d)}{(da-dc)} \times \frac{(dc)}{(d)} \times 100\%$$

in which $d$ is the density of the film $dc$; is the density of the crystalline structure; and $da$ is the density of the non-crystalline structure in the film.

The following table gives examples of linear polyamides having a crystallinity of not more than about 25% measured at 25° C.; as well as their melting point (° C.).

| | dc | da | d | Melting point (° C.) |
|---|---|---|---|---|
| Poly-hexamethyleneadipamide | 1.24 | 1.09 | <1.124 | 265 |
| Poly-ε-caproamide | 1.212 | 1.113 | <1.135 | 225 |
| Poly-11-aminoundecanamide | 1.12 | 1.01 | <1.035 | 194 |
| Poly-hexamethylenesebacamide | 1.157 | 1.041 | <1.067 | 227 |

Polyamide films useful in the process of the present invention can in general be prepared by the following processes:

(1) Extrusion of molten polymer (e.g., T-die process, inflation process, etc.).
(2) Processes using solvents (e.g., dry processes, wet processes, etc.).

In the following part of the specification, the polyamide films described are free from additives such as plasticizers.

The terms "draw speed," "ratio of draw speeds," "draw ratios" and "draw temperatures" have the same meanings as set forth in parent application Ser. No. 734,212, filed June 4, 1968 (incorporated by reference), the aforesaid application also setting forth the "necking out" or breakage of the film and other imperfections resulting from deviating from the above-defined process conditions. In the interests of brevity, this disclosure will not be repeated but is incorporated by reference.

The aforesaid process permits the production of very thin films of 5 to 60, preferaably 10 to 40 microns in thickness. Such thin films cannot be readily obtained by conventional processes since high draw ratios as presently employed were not possible.

The following Table A summarizes key physical properties of the unique polyamide films of the present invention which distinguishes such films from the prior art.

TABLE A.—PHYSICAL CHARACTERISTICS OF POLYAMIDE FILM

| Property | Pure polyamide |
|---|---|
| Tensile strength (kg./cm.²) in— | |
| At least one direction | At least 1,600 preferably 1,800. |
| Both directions | At least 1,000. |
| Elongation (percent) | 20–130, preferably 50–100. |
| Thickness (μ) | 5–60, preferably 10–40. |
| Transparency to visible light (percent) | 85–95. |
| Crystallinity (percent) | Greater than 30. |
| Heat shrinkage (percent at 100° C.) | Less than 6, preferably 4 or less. |

Polyamide film formed by a process utilizing a series of treatment steps including a heat-setting, heat-shrinkage and further heat-setting, has improved properties and in particular, good dimensional stability.

According to one preferred process, a drawn film is heated for about 1 second to 1 minute at about 120° C. to a temperature not higher than 10° C. below the melting point of the film to improve the dimensional stability of the drawn film whereby the crystallization and removal of distortion of polyamide film can be achieved. The period of time for the heat-setting depends upon the thickness of the drawn film, temperature of heat-setting and desired properties of the film, etc. As an optional feature, a shrinking step for the removal of distortion of the drawn film which comprises shrinking a drawn film simultaneously and biaxially at a ratio of shrinking speeds of about 0.5:1 to 2.0:1, to an extent of about 1–10%, and from 120° C. to a temperature not higher than 10° C. below the melting point of the film can be employed.

The ratio of shrinking can be defined as follows:

$$\text{Ratio of shrinking} = \frac{d4-d3}{d3} \times 100\%$$

in which $d3$ and $d4$ are the thickness of a polyamide film before and after shrinking, respectively.

FIG. 1 is a plan view of one form of film track for practicing the present process to obtain the unique polyamide films of the present invention.

The drawing shows a polyamide film 1 (without beaded edges) moving along a film-track B in th direction of arrow A. The film passes through successive heating zones 4, 5, 6, 7, 8, 9 (heated by any suitable heating means, e.g., infra-red radiation, electrical elements) disposed along the film track B to effect temperature control for pre-heating, drawing, heat-setting, shrinking, heat-setting, and cooling the film, respectively.

The film is led through the film track B by means of a pair of endless link conveyors 2 having efficient gripping means 3; the driving means for the conveyors are not shown. The conveyors comprise inner and outer plates connected by pivoted zig-zag connecting members 11 so that the conveyors can run on guide rails 10 and 12. The plates adjacent to guide rails 10 are provided on their outsides with efficient gripping means 3 adapted to open at the inlet 13 of the film-track B and grip the edge of the film 1, and open again at the outlet 14 of the film-track B to release the film.

The trough-put speed of the film in the various zones 4, 5, 6, 7, 8, 9 depends upon the speed of the corresponding parts of the conveyors 2 in the direction of arrow A (the longitudinal direction) which in turn depends upon the separation of guide rails 10 and 12. In the zones 4, 6, and 8, the transverse dimensions of the film are denoted by $W_1$, $W_2$ and $W_3$ respectively, and the separation of two adjacent gripping means 3 by $P_1$, $P_2$ and $P_3$ respectively.

Stretching in the longitudinal direction equal $P_2:P_1$, and stretching in the transverse direction equals $W_2:W_1$; similarly ratios of shrinking in the longitudinal direction and in the transverse direction are respectively $P_3:P_2$ and $W_3:W_2$.

Stretching and shrinking in the transverse directions are determined by the shape of the film-track as defined by rails 10, whereas stretching and shrinking in the longitudinal direction are determined by the changes in the separation of the inner and outer plates on rails 10 and 12. The separation of the inner and outer plates is denoted by $b_1$, $b_2$, and $b_3$ in zones 4, 6 and 8 respectively (i.e., before drawing, after drawing, and after shrinking). $P_1$, $P_2$ and $P_3$ and $W_1$, $W_2$ and $W_3$ are preferably determined by the following ratios:

$$W_2/W_1 = 2 \text{ to } 5$$

$$\frac{W_2 - W_3}{W_2} \text{ less than } 0.1$$

$$\frac{P_2 - P_3}{P_2} \text{ less than } 0.1$$

The draw speeds and their various ratios depend upon the respective conformations of guide rails 10 and 12 and the film-track, and can be changed by adjusting the positions of the guide rails.

The separation of adjacent gripping means 3 is rather critical for good results in simultaneous biaxial drawing; disadvantages caused by concentration of stress are generally best avoided by separating adjacent gripping means by 20 to 35 mm.

The present invention is illustrated by the following examples, in which tensile strength and elongation respectively were measured at a temperature of 25° C. and a relatively humidity of 60% by using ASTM D-882-61T. The density of the films was measured at 25° C. by means of the gradient tube method using a mixture of ligroin and carbon tetrachloride.

"Transparency to visible light" ($T_p$) (also referred to as "parallel luminous transmittance") is measured in an analogous manner to ASTM D-1003-61 by measuring total luminous transmittance ($T_t$) and haze ($H_z$) and calculating $T_p$ by the following formula:

$$T_p \times 100 = T_t(100 - H_z)\%$$

In the following tablets, each shrinkage value is a ratio of shrinking per unit area, which was obtained by leaving a film for 1 minute in hot air to give free shrinkage without any tension. In Examples 1, 4, 6, 7 and 8 "shrinkage" values were measured at 130° C.

In all examples, the crystallinity of the drawn film is more than 30%.

EXAMPLE 1

A substantially amorphous film (density of 1.130 g./cc.; thickness 0.1 mm.; no beaded edges) of poly-ε-caproamide (relative viscosity 2.7 when measured at 25° C. in 96% sulphuric acid) was passed at a speed of about 20 m./min. through a pre-heating zone 2 m. (meters) in length, where the atmosphere was maintained at 150° C. The pre-heated film was drawn simultaneously and biaxially at a ratio of draw speeds of about 1.5:1 with a draw speed of about 32,000 percent/min. at 130° C. The drawn film was heat-set for 2 seconds at 180° C. under tension such that is dimensions would be kept constant in a transverse direction.

The heat-set film was simultaneously and biaxially shrunk with a ratio of shrinkage speed of about 1.5:1 for 10 seconds at 180° C. to give 4% shrinkage value in both the longitudinal and transverse directions.

The shrunk film was again heat-set for 3 seconds at 190 C. under tension such that the transverse dimensions would be kept constant to give a film 0.01 mm. in thickness. The following table shows properties of the resulting film (a) in comparison with those of a substantially amorphous film (b) having a thickness of 0.01 mm. produced by a conventional process from the same raw material as described in this example.

| Properties | (A) | (B) |
|---|---|---|
| Tensile strength: | | |
| Longitudinal, kg./cm.² | 1,800 | 700 |
| Transverse, kg./cm.² | 1,100 | |
| Elongation: | | |
| Longitudinal, percent | 30 | 300 |
| Transverse, percent | 90 | |
| Shrinkage value (at 130° C.), percent | <2 | |
| Transparency to visible light, percent | 90 | 85 |
| Haze, percent | 2.0 | 1.5 |
| Density | 1.148 | |

In the above table and also the tables of the following examples, blanks are left in respect of values which have not been determined.

EXAMPLE 2

A substantially amorphorus film (density of 1.128 g./cc.; thickness 0.1 mm.) of poly-ε-caproamide (which had a relative viscosity of 3.0 when measured at 25° C. in 90% sulphuric acid) was preheated in an analogous manner to that described in Example 1 by passing through a preheating zone 2 m. in length, where the atmosphere was maintained at 120° C., and then was drawn simultaneously and biaxially at a ratio of draw speeds of about 0.8 with a draw speed of about 32,000 percent/min. at 130° C. to give a film 0.08 mm. in thickness. The film obtained was treated under the following conditions to provide films having different properties. In the following table, the meanings of the various letter headings are set out below the table.

| a | b | | c | | | | d | | e | | | | |
|---|---|---|---|---|---|---|---|---|---|---|---|---|---|
| | | | | | | | | | f | | g | | |
| | C | t | C | t | SV | SS | C | t | L | T | L | T | SV |
| 1 | 180 | 30 | | | | | | | 1,900 | 2,600 | 100 | 25 | 6 |
| 2 | 180 | 2 | 180 | 10 | 4 | 08:1 | 180 | 5 | 1,800 | 2,500 | 100 | 30 | 2 |
| 3 | 180 | 2 | 180 | 5 | 8 | 1:1 | 180 | 2 | 1,900 | 2,500 | 100 | 25 | 1 |
| 4 | 180 | 2 | 180 | 10 | 6 | 1.2:1 | 180 | 2 | 1,700 | 2,600 | 110 | 30 | 2 |
| 5 | 180 | 2 | 180 | 10 | 8 | 3:1 | 180 | 2 | 1,500 | 2,000 | 120 | 60 | 2 |

NOTE.—Headings: a=Test No.; b=Heat-setting under tension; c=Shrinkage step; d=Heat-setting under tension; e=Properties of films obtained; f=Tensile strength; g=Elongation; L=Longitudinal; T=Transverse; C=Temperature (° C.); t=Time (seconds); SV=Shrinkage value (percent); SS=Ratio of shrinking speeds.

The table shows that the prepared film possessed far superior properties to that obtained by Test No. 1 and that a film obtained a draw-speed ratio of 3:1 (Test No. 5) had poor properties.

EXAMPLE 3

A substantially amorphorus film (density of 1.028 g./cc.; thickness 0.1 mm.) of poly-11-amino-undecanamide (relative viscosity of 2.7 when measured at 25° C. by a similar manner to that described in Example 1) was preheated in an analogous manner to that described in Example 1 by passing with a speed of 20 m./min. through a preheating zone 2 m. in length, where the atmosphere was maintained at 120° C., and was then drawn simultaneously and biaxially for 3 seconds at a ratio of draw speeds of about 0.8:1 to 1.2:1 with a draw speed of about 20,000 percent/min. at 100° C. to draw a film elongated approximately 3 times in both longitudinal and transverse directions.

The drawn film was passed through a heat-setting zone 10 m. in length, where the atmosphere was maintained at 145° C., with a through-put speed of 60 m./min. under tension such that the transverse dimension would be kept constant and then was treated by cool air to give a film 0.01 mm. in thickness. The following table shows the properties of the resulting film (A) in comparison with those of a substantially amorphous film (B) having a thickness of 0.01 mm. produced by a conventional process from the same raw material as described in this example.

| Properties | (A) | (B) |
|---|---|---|
| Tensile strength: | | |
| Longitudinal, kg./cm.² | 2,000 | 600 |
| Transverse, kg./cm.² | 2,200 | |
| Elongation: | | |
| Longitudinal, percent | 90 | 300 |
| Transverse, percent | 100 | |
| Shrinking value (at 100° C.), percent | 4 | |
| Transparency to visible light, percent | 90 | 85 |
| Haze, percent | 1.2 | |
| Density | 1.048 | |

EXAMPLE 4

A substantially amorphous film (0.1 mm. in thickness; density 1.128 g./cc.; no beaded edges) of poly-ε-caproamide (relative viscosity 2.7 when measured by an analogous manner to that described in Example 1) was simultaneously and biaxially drawn in an analogous manner to that described in Example 3 at a draw ratio of about 1:1 and at a draw speed of about 20,000 percent/min. at 120° C. The drawn film was heat-set for 60 seconds under tension as described in the above-mentioned examples at 180° C. to give a film (A) 0.01 mm. in thickness, the properties of which are compared in the following table with those of a substantially amorphous film (B) produced by a conventional process from the same raw material as that described in this example.

| Properties | (A) | (B) |
|---|---|---|
| Tensile strength: | | |
| Longitudinal, kg./cm.² | 1,800 | 700 |
| Transverse, kg./cm.² | 2,000 | |
| Elongation: | | |
| Longitudinal, percent | 60 | 300 |
| Transverse, percent | 30 | |
| Shrinkage value (at 130° C.), percent | 2 | |
| Transparency to visible light, percent | 90 | 85 |
| Haze, percent | 1.6 | |
| Density | 1.150 | |

EXAMPLE 5

A substantially amorphous film (0.1 mm. in thickness; density 1.130 g./cc.; no beaded edges) of poly-ε-caproamide was drawn in an analogous manner to that described in Example 1 except that no heat-setting was carried out.

The film was simultaneously and biaxially drawn at 130° C., with a draw speed of about 60,000 percent/min., and then was treated by air cooling to give an improved film 0.01 mm. in thickness. The following table shows properties of the film obtained.

Tensile strength, kg./cm.²:
  Longitudinal _____ 1800
  Transverse _____ 1100
Elongation, percent:
  Longitudinal _____ 30
  Transverse _____ 90

EXAMPLE 6

A substantially amorphous film (0.1 mm., in thickness; density 1.128 g./cc.; no beaded edges) of poly-ε-caproamide (relative viscosity 3.0 when measured at 25° C. in 96% sulphuric acid) was simultaneously and biaxially drawn in a similar manner to that described in Example 3 with a draw speed of about 30,000 percent/min. at 130° C. and was then heat-set for 60 seconds at 180° C. under tension such that dimensions would be kept constant to obtain an improved film.

The following table shows some properties of the film obtained.

Tensile strength, kg./cm.²:
  Longitudinal _____ 1900
  Transverse _____ 2000
Elongation, percent:
  Longitudinal _____ 100
  Transverse _____ 25
Shrinkage value (at 130° C.), percent _____ 3
Transparency to visible light, percent _____ 88
Haze, percent _____ 3
Density _____ 1.147

EXAMPLE 7

A substantially amorphous film (0.1 mm. in thickness; density 1.029 g./cc.) of poly-11-amino-undecanamide (relative viscosity 2.7 when measured in a similar manner to that described in Example 1) and made by the T-die process was passed with a through-put speed of 20 m./min. through a preheating zone 2 m. in length, where the atmosphere was maintained at 120° C. The preheated film was simultaneously and biaxially drawn with a draw speed of about 17,000 percent/min. at 100° C. by passing through a drawing zone 2.5 m. in length, with a ratio of draw speeds of 0.8 to 1.2:1 in the first 1.75 m. and a ratio of draw speeds of 0.9 to 1.1:1 in the last 0.75 m. respectively, to give an approximately 3 fold elongation in both the longitudinal and transverse directions.

The drawn film was heat-set by passing through a heat-setting zone 2 m. in length, where the atmosphere was maintained at 145° C. by means of hot air, with a through-put speed of 66 m./min. under tension such that the transverse dimension would be kept constant, and was then passed through a shrinking zone 10 m. in length, where the atmosphere was maintained at 145° C. by means of hot air, with a ratio of shrinking speeds of about 1:1 to give a shrinkage value of 6% in both the longitudinal and transverse directions.

Afterwards the shrunk film was cooled by means of cool air to give an improved film 0.01 mm. in thickness.

The following table compares properties of the film (A) of this example with those of another film (B) which was preheated and drawn in the same manner as described above except that it was then heat-set for 10 seconds under tension in a similar manner to that described above at 145° C., and with those of yet another film (C) 0.01 mm. in thickness which had a substantially amorphous structure and which was produced by a conventional process from the same raw material as described in this example.

| Properties | (A) | (B) | (C) |
|---|---|---|---|
| Tensile strength: | | | |
| Longitudinal, kg./cm.² | 2,000 | 2,000 | 600 |
| Transverse, kg./cm.² | 2,200 | 2,000 | |
| Elongation: | | | |
| Longitudinal, percent | 90 | 85 | 300 |
| Transverse, percent | 100 | 90 | |
| Shrinkage value (at 130° C.) less than, percent | 2 | 4 | |
| Transparency to visible light, percent | 90 | 90 | 85 |
| Haze, percent | 1.4 | 1.4 | 2.0 |

EXAMPLE 8

A substantially amorphous film (0.11 mm. in thickness; density 1.128 g./cc.; no beaded edges) of poly- ε-caproamide (relative viscosity 2.7 when measured at 25° C. in 96% sulphuric acid) was preheated by passing through a preheating zone 2 m. in length, where the atmosphere was maintained at 140° C., with a through-put speed of 15 m./min. The preheated film was simultaneously and biaxially drawn for 3 seconds in a drawing zone 1.5 m. in length in an analogous manner to that described in Example 3 with a ratio of draw speeds of about 1:1 and in an atmosphere having a temperature of 120° C. to give an approximately 3 fold elongation in both the longitudinal and transverse directions.

The drawn film was passed through a heat-setting zone 3 m. in length, where the atmosphere was maintained at 180° C. under tension such that the transverse dimension would be kept constant.

The heat-set film was passed through a shrinking zone having a length of about 7.5 m., where the atmosphere was maintained at 190° C. by means of hot air, with a ratio of shrinking speeds of about 1:1 to give a shrinkage value of 3% in both the longitudinal and transverse directions, and then was cooled by means of cool air to give an improved film 0.01 mm. in thickness. The following table shows the properties of the film (A) obtained in this example in comparison with those of a film (B) 0.01 mm. in thickness, which was obtained from the same raw material of this example in a similar manner to that described in this example except that heat-setting was carried out for 10 seconds under tension at 145° C. and those of a substantially amorphous film (C) 0.01 mm. in thickness produced by a conventional process from the same raw material as described in this example.

| Properties | (A) | (B) | (C) |
|---|---|---|---|
| Tensile strength: | | | |
| Longitudinal, kg./cm.² | 1,800 | 1,800 | 700 |
| Transverse, kg./cm.² | 2,000 | 2,000 | |
| Elongation: | | | |
| Longitudinal, percent | 60 | 60 | 300 |
| Transverse, percent | 30 | 30 | |
| Shrinkage value (at 130° C.) less than, percent | 2 | 5 | |
| Transparency to visible light, percent | 90 | 90 | 85 |
| Haze, percent | 1.2 | 1.2 | 1.5 |

EXAMPLE 9

A substantially amorphous film (density of 1.130 g./cc.; thickness 0.45 mm.; no beaded edge) of poly- ε-caproamide (relative viscosity 2.7 when measured at 25° C. in 96% sulphuric acid) was passed at a speed of about 12 m./min. through a preheating zone 4 m. in length, where the atmosphere was maintained at 180° C. and was then simultaneously and biaxially drawn for 2.2 seconds at a ratio of draw speeds of about 1.0:1 to about 1.3:1 with a draw speed of about 24,000 percent/min. at 170° C. to draw a film elongated approximately 3 times in both longitudinal and transverse directions.

The drawn film was passed through a heat-setting zone 6 m. in length, where the atmosphere was maintained at 215° C., with a through-put speed of 36 m./min. under tension such that the transverse dimension would be kept constant and then was treated by cool air to give a film 0.05 mm.

Tensile strength, kg./cm.²:
 Longitudinal _____ 2500
 Transverse _____ 2400
Elongation, percent:
 Longitudinal _____ 80
 Transverse _____ 70
Shrinkage value (at 100° C.), percent _____ 2
Transparency to visible light, percent _____ 87
Haze, percent _____ 4
Density _____ 1.150

EXAMPLE 10

A substantially amorphous film (density of 1,130 g./cc.; thickness 0.3 mm.; no beaded edge) of poly-ε-caproamide (relative viscosity 2.7 when measured at 25° C. in 96% sulphuric acid) was passed at a speed of about 20 m./min. through a preheating zone 2 m. in length, where the atmosphere was maintained at 160° C. and was then simultaneously and biaxially drawn for about 1.8 seconds at a ratio of draw speeds of about 0.8:1 to about 1.0:1 with a draw speed of about 22,000 percent/min. at 150° C. to draw a film elongated approximately 3.3 times in both longitudinal and transverse directions.

The drawn film was passed through a heat-setting zone 10 m. in length, where the atmosphere was maintained at 215° C., with a through-put speed of 60 m./min. under tension such that the transverse dimension would be kept constant and then was treated by cool air to give a film 0.03 mm.

Tensile strength, kg./cm.²:
 Longitudinal _____ 2500
 Transverse _____ 2500
Elongation, percent:
 Longitudinal _____ 70
 Transverse _____ 70
Shrinkage value (at 100° C.), percent _____ 3
Transparency to visible light, percent _____ 87
Haze, percent _____ 3
Density _____ 1.155

EXAMPLE 11

A substantially amorphous film (density of 1.009 g./cc.; thickness 0.16 mm.) of polylaurineamide was passed at a speed of about 20 m./min. through a pre-heating zone 1 m. in length, where the atmosphere was maintained at 130° C. The preheated film was drawn simultaneously and biaxially at a ratio of draw speeds of about 0.6:1 to 1:1 with a draw speed of about 32,000 percent/min. at 120° C. to draw a film with a magnification of 3.0 in the longitudinal direction and 3.5 in the transverse direction. The drawn film was heat-set by passing through a heat-setting zone 6 m. in length with a through-put speed of 60 m./min. at 160° C. under tension such that the transverse direction would be kept constant and then was treated by cool air to give a film 0.015 mm. in thickness. The following table shows the properties of the resulting film (A) in comparison with those of a substantially amorphous film (B) having a thickness of 0.015 mm. produced by a conventional process from the same raw material as described in this example.

| Properties | (A) | (B) |
|---|---|---|
| Tensile strength: | | |
| Longitudinal, kg./cm.² | 1,500 | 300 |
| Transverse, kg./cm | 1,700 | |
| Elongation: | | |
| Longitudinal, percent | 110 | 250 |
| Transverse, percent | 50 | |
| Shrinkage value (at 120° C.): | | |
| Longitudinal, percent | 2.5 | |
| Transverse, percent | 3.4 | |
| Transparency to visible light, percent | 90 | 85 |
| Haze, percent | 0.5 | |
| Density | 1.041 | |

According to the present invention, polyamide films can be drawn with a larger elongation to give improved properties to the drawn film, and whereas various additives e.g., plasticizers, can be used, pure polyamide films can be obtained without any additives. However, the properties of pure polyamide films cannot be improved by the use of any additives such as conventional plasticizers. On the contrary, such additives can have a deleterious effect upon the properties of pure polyamide films.

The films obtained according to the present invention can be utilized without any after-treatment or finishing process, for example, for industrial, packaging, textile, and commercial uses. Films prepared according to the present invention have improved properties such as transparency, mechanical properties such as tensile strength, soft feel, brightness, air and vapor permeability, oil resistance and electrical properties. Furthermore, films prepared according to the present invention possess high dimensional stability.

All films according to the invention obtained by the processes of the various examples were observed to be suitable for various practical purposes including electrical, textile, packaging, and insulating uses.

What is claimed is:

1. A biaxially drawn synthetic linear polyamide film having across substantially its entire area a tensile strength of at least 1600 kg./cm.$^2$ in one direction, a transparency to visible light of from 85% to 95% and a thickness of 5 to 60$\mu$.

2. The film of claim 1 selected from the class consisting of poly-$\epsilon$-caproamide, poly-hexamethylene - adipamide, poly - hexamethylene - sebacamide, poly-11-amino-undecamide and polylaurineamide.

3. The film of claim 1 having a heat shrinkage of less than 4% at 100° C.

4. A biaxially drawn synthetic linear polyamide film having across substantially its entire area a tensile strength of at least 1600 kg./cm.$^2$ in at least one direction, a transparency to visible light of from 85% to 95%, a heat shrinkage of less than 6% at 100° C., and a thickness of from 5 to 60$\mu$.

References Cited

UNITED STATES PATENTS

| | | | |
|---|---|---|---|
| 2,618,012 | 11/1952 | Milne | 264—289 |
| 3,354,023 | 11/1967 | Dunnington et al. | 161—402 |
| 3,449,299 | 6/1969 | Schneider et al. | 260—78 S |

FOREIGN PATENTS

| | | | |
|---|---|---|---|
| 945,443 | 12/1963 | Great Britain | 264—289 |
| 954,420 | 4/1964 | Great Britain | 264—289 |

CHARLES E. VAN HORN, Primary Examiner

U.S. Cl. X.R.

161—165, 402, 411